United States Patent Office 3,108,116
Patented Oct. 22, 1963

3,108,116
NOVEL 1,3,4,5-TETRAHYDRO - 5 - OXOBENZ[cd]IN-
DOLE-3-CARBOXYLIC ACIDS, TO DERIVATIVES
THEREOF, AND TO NOVEL PROCESSES FOR
THE PREPARATION OF THE SAME
Jacob Szmuszkovicz, Kalamazoo, Mich., assignor to The
Upjohn Company, Kalamazoo, Mich., a corporation
of Delaware
No Drawing. Filed Aug. 4, 1961, Ser. No. 129,221
16 Claims. (Cl. 260—319)

The present invention relates to novel compounds and to processes for the preparation of the same. More particularly the invention relates to novel 1,3,4,5-tetrahydro-5-oxobenz[cd]indole-3-carboxylic acids, to derivatives thereof, and to novel processes for the preparation of the same.

The novel 1,3,4,5 - tetrahydro-5-oxobenz[cd]indole-3-carboxylic acids of the invention can be represented by the following formula:

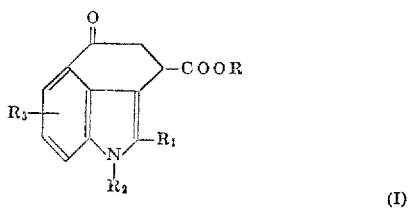

(I)

wherein R represents hydrogen and lower-alkyl, e.g., methyl, ethyl, propyl, butyl, amyl, hexyl, heptyl, octyl, and the isomeric forms thereof; $R_1$ represents hydrogen, alkyl of from 1 to 4 carbon atoms, inclusive, e.g., methyl, ethyl, propyl, isopropyl, butyl, isobutyl, and the like, phenyl, hydroxyphenyl, e.g., p-hydroxyphenyl, m-hydroxyphenyl, 2,3-dihydroxyphenyl, 3,4-dihydroxyphenyl, 2,3,4-trihydroxyphenyl, and the like, alkoxyphenyl wherein the alkoxy moiety is of from 1 to 4 carbon atoms, inclusive, e.g., p-methoxyphenyl, p-ethoxyphenyl, m-butoxyphenyl, o-propoxyphenyl, 2,3,4-triethoxyphenyl, 3,4-dimethoxyphenyl, 3,4,5-trimethoxyphenyl, and the like, and halophenyl, e.g., p-chlorophenyl, p-bromophenyl, p-iodophenyl, p-fluorophenyl, 3,4-dichlorophenyl, 2,3,4-tribromophenyl, and the like; $R_2$ represents hydrogen, alkanoyl of from 1 to 4 carbon atoms, inclusive, e.g., acetyl, propionyl, butyryl, and the like, benzyl and halobenzyl, e.g., chloro-, bromo-, iodo- and fluorobenzyl which can be substituted with alkyl or alkoxy of from 1 to 4 carbon atoms, inclusive, and alkyl of from 1 to 4 carbon atoms, inclusive, e.g., methyl, ethyl, propyl, butyl, isobutyl, and the like; and $R_3$ represents hydrogen, hydroxy, benzyloxy, alkyl of from 1 to 4 carbon atoms, inclusive, e.g., methyl, ethyl, propyl, butyl, isobutyl, and the like, halogen, e.g., fluorine, chlorine, and bromine, and alkoxy of from 1 to 4 carbon atoms, inclusive, e.g., methoxy, ethoxy, propoxy, butoxy, and the like.

The novel 1,3,4,5 - tetrahydro-5-oxobenz[cd]indole-3-carboxylic acids of the invention are useful as intermediates. Thus the carboxyl group can be esterified and the oxo group can be reacted with carbonyl binding agents such as semicarbazide, thiosemicarbazide, and 2,4-dinitrophenyl-hydrazine. The carboxyl group can be esterified in accordance with U.S. Patent 2,220,521 to form beta-cyanoethyl esters useful for the purposes, especially as insecticides, described in this patent. The novel 1,3,4,5-tetrahydro-5-oxobenz[cd]indole-3-carboxylic acids according to the invention have tranquilizing activity and can be used to calm agitated mammals and other animals. They also exhibit characteristic absorption of light in the visible, ultraviolet, and infrared bands and accordingly are useful, in solutions or dispersed in plastic films, as light filters.

The novel 1,3,4,5 - tetrahydro-5-oxobenz[cd]indole-3-carboxylic acids of the invention are prepared by cyclizing 1-substituted-3-indolesuccinic anhydrides ($R_2$ being other than hydrogen). The cyclization can be effected with aluminum chloride. The reaction is advantageously effected in a Friedel-Crafts solvent, for example, ethylene dichloride, sym.-tetrachloroethane, nitrobenzene, carbon disulfide, and the like. The reaction can be carried out at room temperature (about 24–30° C.), although in some cases gentle heating can be used. Advantageously the reagents are brought together at room temperature with or without cooling as may be desired and then heated on a steam bath until the reaction is complete. A molar excess of condensing agent, for example, 3 moles of aluminum chloride for each mole of anhydride, is advantageously used. The amount of condensing agent, however, can be varied over a wide range without affecting the reaction other than in the matter of yield. Ordinarily it will not be necessary or desirable to use more than about 5 moles or less than about 2 moles of condensing agent for each mole of anhydride. The product can be recovered from the reaction mixture and purified by recrystallization in a conventional manner. Advantageously, the reaction mixture is cooled and treated with concentrated hydrochloric acid to insure effective precipitation of the product. Other strong acids, for example, sulfuric acid and phosphoric acid can be used.

It has been proposed heretofore (Plieninger and Suhr, Chem. Ber. 90, 1984–1987, 1957) to form methyl 1,3,4,5-tetrahydro-4-oxobenz[cd]indole-5-carboxylate by cyclizing dimethyl 3,4-indolediacetate by the Dieckmann condensation, but the desired product was not obtained, due perhaps to the fact that it would have been both a beta-tetralone and a beta-keto ester. Although Plieninger and Müller eventually prepared the corresponding ethyl ester (Chem. Ber. 93, 2029, 1960), the compound was so unstable that it had to be maintained in the absence of air or in ether solution, and even then was stable only for a few days. In contrast the compounds of the invention are very stable even in the presence of such strong reagents as aluminum chloride and can easily and readily be converted to stable derivatives.

The 1-substituted-3-indolesuccinic anhydrides used as starting materials in the process of the invention can be prepared by reacting the corresponding 1-substituted-3-indolesuccinic acid with isopropenyl lower-alkanoate, for example, isopropenyl formate, acetate, propionate, and butyrate. The 1-lower-alkanoyl-3-indolesuccinic anhydrides can also be obtained by reacting the corresponding 1-unsubstituted-3-indolesuccinic anhydrides with isopropenyl lower-alkanoate. Advantageously, the reaction is carried out in the presence of an inert solvent which may be an excess of the isopropenyl lower-alkanoate and in the presence of an acidic catalyst, for example, p-toluenesulfonic acid, methanesulfonic acid, sulfuric acid, sulfonic acid ion-exchange resins, and the like. The acetone formed in the reaction is distilled off to complete the reaction and the product can be recovered from the solution in any suitable manner, for example, by crystallization with or without recrystallization.

The starting 3-indolesuccinic acids can be represented by the formula:

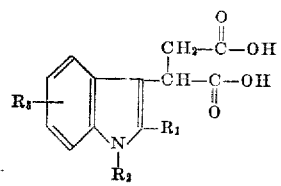

(II)

wherein $R_1$, $R_2$, and $R_3$ have the significance defined above.

They are prepared by two procedures depending on whether $R_1$ is hydrogen or other than hydrogen. For example, when $R_1$ is other than hydrogen, the 3-indolesuccinic acids can be prepared by condensing the corresponding 3-unsubstituted indole with maleic anhydride or maleic acid in accordance with the procedure of Diels and Alder, Ann. 490, 277, 1931. When maleic anhydride is used, it is, sometimes unnecessary to go through the succinic acid stage. However, because of the difficulty of isolating the anhydride in most cases, and the possibility of competing side reactions, it is ordinarily desirable to hydrolyze the anhydride and to recover the 3-indolesuccinic acid for use as starting material. In such case the reaction mixture is allowed to stand for about 15 to 120 minutes and aqueous alkali, e.g., sodium hydroxide, potassium hydroxide, sodium carbonate, and the like, is added to the mixture. The alkaline mixture is heated, suitably to between about 50° C. and about 100° C., for a period between about 30 minutes to about 1 hour, cooled, and decanted. The aqueous solution thus obtained is acidified, e.g., with hydrochloric acid, sulfuric acid, phosphoric acid, hydrobromic acid, and the like. After standing for several hours, e.g., 2 to 12 hours, the 3-indolesuccinic acid is recovered by filtration.

When $R_1$ is hydrogen the 3-indolesuccinic acids are prepared by the procedure of Perron et al., J. Org. Chem. 24, 1165, 1959, which involves condensing a 3-indolecarboxaldehyde with ethyl cyanoacetate or diethyl malonate, reacting the condensed product with potassium cyanide in ethanol, and hydrolyzing the resulting cyano derivative with aqueous potassium hydroxide solution.

The 3-indolecarboxaldehydes can be prepared by reacting a 3-unsubstituted indole with dimethylformamide, in the presence of phosphorus oxychloride, using essentially the procedure described by Smith, J. Chem. Soc. 1954, 3842.

The starting indoles utilized to prepare 3-indolesuccinic acids can be prepared by the processes disclosed in U.S. Patent 2,825,734.

When hydroxy-substituted compounds ($R_3$=hydroxy) are desired the corresponding benzyloxy-substituted compounds should be used. The benzyloxy group can be converted to hydroxy by hydrogenolysis which can be advantageously carried out in the presence of a palladium catalyst such as palladium black, palladium-barium sulfate, palladium-charcoal and the like, in the manner more fully disclosed in U.S. Patent 2,708,197.

If the starting indole compound contains an N-hydrogen ($R_2$=hydrogen) the reaction with isopropenyl lower-alkanoate will acylate the nitrogen with a lower-alkanoyl group. The same or a different acyl group can be present in the starting 3-indolesuccinic acids. These acyl groups can, when desired, be removed from the 1,3,4,5-tetrahydro-5-oxobenz[cd]indole-3-carboxylic acid by simple hydrolysis or they can be carried on in further processing of the compound and removed when and if desired by simple hydrolysis.

The 1,3,4,5 - tetrahydro-5-oxobenz[cd]indole-3-carboxylic acids of the invention are readily converted to the corresponding 1,3,4,5-tetrahydrobenz[cd]indole-3-carboxylic acids by a Huang-Minlon reduction. The acid is converted to the salt form, advantageously with potassium hydroxide or other alkali metal hydroxide, and then reduced with hydrazine hydrate. Advantageously, the reaction is carried out in an inert solvent, for example, diethylene glycol and triethylene glycol, at a temperature from about 180° C. to about 210° C. The desired 1,3,4,5-tetrahydrobenz[cd]indole-3-carboxylic acid is then obtained by acidifying the reaction mixture with hydrochloric acid or other strong acid and recovered by such processes as extraction and crystallization. When the indole nitrogen of the starting material is acylated the acyl group will be hydrolytically removed in the Huang-Minlon reduction. The product acid, however, can be reacylated by the usual process for the N-acylation of indoles when the N-acyl product is desired.

The novel 1,3,4,5-tetrahydrobenz[cd]indole-3-carboxylic acids thus obtained are also useful as intermediates. The carboxyl group can be esterified in accordance with U.S. Patent 2,20,521 to form beta-cyanoethyl esters useful for the purposes, especially as insecticides, described in this patent. The novel 1,3,4,5-tetrahydrobenz[cd]indole-3-carboxylic acids according to the invention exhibit characteristic absorption of light in the visible, ultraviolet, and infrared bands and accordingly are useful, in solutions or dispersed in plastic films, as light filters. They show strong absorption in the 280 to 300 millimicron range and accordingly can be used in sun-screen lotions. They can also be decarboxylated to compounds of the type:

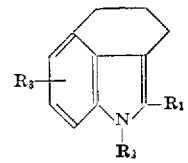

(III)

wherein $R_1$, $R_2$, and $R_3$ have the significance defined above, which also can be used as ultraviolet absorbents in sun-screen lotions.

The acids, according to the invention, can be esterified by known methods, for example, the acids can be treated with diazomethane to form the methyl esters or they can be converted to the acid chloride and esterified with lower-alkanols. Advantageously, the acid halides are formed by heating the acids, suitably at reflux, in a hydrocarbon solvent, for example benzene, with oxalyl halide. The resulting acid halide can then be esterified with an alkanol.

The esters can be utilized in the same way as the acids. Moreover, they are useful in purifying the acids; thus by esterifying a crude acid, isolating the ester, and hydrolyzing it, the acid is upgraded.

The following examples are illustrative of the process and products of the present invention, but are not to be construed as limiting.

EXAMPLE 1

*Preparation of 1-Acetyl-2-Methyl-1,3,4,5-Tetrahydro-5-Oxobenz[cd]Indole-3-Carboxylic Acid, 2-Methyl-1,3,4,5-Tetrahydro-5-Oxobenz[cd]Indole - 3 - Carboxylic Acid, and 2-Methyl-1,3,4,5-Tetrahydrobenz[cd]Indole-3-Carboxylic Acid*

A. 2-METHYL-3-INDOLESUCCINIC ACID

A mixture of 131.2 g. of 2-methylindole and 116.1 g. of maleic acid was mixed and heated on the steam bath. After 10 minutes the mixture melted and then started to solidify. The flask was removed from the bath and a vigorous reaction ensued. The mixture was allowed to stand for 30 minutes. A solution of 113 g. of potassium hydroxide in 1800 ml. of water was added and the mixture was heated on the steam bath with stirring for 40 minutes. The solution was cooled, decanted, and extracted 4 times with 200-ml. portions of ether. It was then treated with 10 g. of decolorizing carbon while hot, filtered, cooled, acidified with 250 ml. of concentrated hydrochloric acid, and allowed to crystallize in the refrigerator. The precipitate was recovered by filtration and washed with cold water to give 126.3 g. of 2-methyl-3-indolesuccinic acid melting at 210–211° C. (dec.).

The filtrate was extracted 4 times with 500-ml. portions of ether. The ethereal extracts were washed with saturated aqueous sodium chloride solution and evaporated to give 10.5 g. of a brown solid which melted at 183–200° C. On recrystallization from 175 ml. of acetonitrile the product, 2-methyl-3-indolesuccinic acid, melted at 210–211° C. (dec.); weight, 5.0 g.

B. 1-ACETYL-2-METHYL-3-INDOLESUCCINIC ANHYDRIDE

A mixture of 233 g. (0.945 mole) of 2-methyl-3-indolesuccinic acid of A, 1880 ml. of isopropenyl acetate, and 18.8 g. of p-toluenesulfonic acid monohydrate was refluxed for 20 minutes. The acetone was then distilled off slowly over a period of 6 hours through a glass-helices packed column. The distillation was allowed to proceed until the boiling point reached 95° C. The solution was then evaporated to dryness and the resulting dark solid was crystallized from 660 ml. of acetic acid and 130 ml. of acetic anhydride. After two days the dark crystals were filtered, washed with acetic acid and then with ether. There was thus obtained 1-acetyl-2-methyl-3-indolesuccinic anhydride; M.P. 185–186° C. (dec.); 123.9 g. (52% yield). This material was suitable for cyclization with aluminum chloride.

A sample was dissolved in benzene, filtered from a dark pigment and allowed to crystallize; pale yellow plates, M.P. 189–191.5° C. This material (0.8 g.) was recrystallized from 2.5 ml. of acetic acid and 0.5 ml. of acetic anhydride, thus obtaining purified 1-acetyl-2-methyl-3-indolesuccinic anhydride; M.P. 192–193° C., after sintering at 189° C.

*Analysis.*—Calc'd for $C_{15}H_{13}NO_4$: C, 66.41; H, 4.83; N, 5.16. Found: C, 66.67; H, 4.77; N, 5.26.

U.V.: 244 (15,450); f. 264 (9,750); f. 272 (8,700); f. 276 (7,950); 290 (5,250); 298.5 (5,250).

In all the ultraviolet determinations, the first figure is the wave length in millimicrons and the second in parentheses is the molar absorptivity; the letter "f." stands for flex; and unless otherwise specified, the solvent was 95% ethanol.

I.R.: Anhydride: 1858, 1775; amide: 1687; C=C: 1605, 1580, 1475 sh.; C—O/C—N: 1305, 1260, 1242, 1220, 1210, 1060, 1035, 1025, 1005, 995; ring: 842, 763, 750, 727, 680.

All the infrared determinations were carried out in a mineral oil mull. The letters "sh." stand for shoulder.

C. 1-ACETYL-2-METHYL-1,3,4,5-TETRAHYDRO-5-OXOBENZ[cd]INDOLE-3-CARBOXYLIC ACID

The anhydride of B (9.57 g., 0.0353 mole) was dissolved in 176 ml. of hot ethylene dichloride. The solution was cooled to room temperature with stirring to give a fine suspension. Aluminum chloride (23.5 g., 0.177 mole) was added all at once. The mixture warmed up slightly and after 5 minutes was heated on the steam bath for 2 hours. It was then cooled in ice, some ice was added, and then a solution of 27 ml. of concentrated hydrochloric acid in 142 ml. of water. The mixture was filtered and the precipitate was washed well with water. The precipitate was dissolved in hot acetone. The solution was treated with decolorizing carbon, filtered, and allowed to cool and crystallize. There was thus obtained 5.6 g. of 1-acetyl-2-methyl-5-oxobenz[cd]indole-3-carboxylic acid in the form of yellow needles, M.P. 215–217° C. (dec.). The second crop amounted to 1.6 g., M.P. 205–207° C. Total yield, 75%.

A sample was recrystallized from acetone for analysis; M.P. 212–216° C., (dec.), after sintering at 207° C.

*Analysis.*—Calc'd for $C_{15}H_{13}NO_4$: C, 66.41; H, 4.83; N, 5.16; N.E. 271. Found: C, 66.37; H, 4.74; N, 5.00; N.E. 263.

U.V.: 226.5 (17,850); 259 (15,250); f. 292 (8,700); f. 303 (10,800); 341 (4,150); in base[1]: f. 220 (16,500); 251 (17,500); f. 272 (3,30); 309 (4,500); 360 (4,050).

I.R.: OH (acid): 3090 sh., 3020 sh., 2700, 2690, 2510, 2340; C=O: 1715, 1700, 1680; C=C: 1655 sh., 1647, 1608, 1587, 1483; C—O: 1320; ring: 790, 756.

The dinitrophenylhydrazone of the above keto acid was prepared and recrystallized from ethanol in the form of orange needles, M.P. 243–244° C. (dec.), after sintering at 240° C.

---
[1] The term "in base" means 0.01 M KOH in 95% EtOH.

*Analysis.*—Calc'd for $C_{21}H_{17}N_5O_7$: C, 55.87; H, 3.80; N, 15.52. Found: C, 55.65; H, 3.74; N, 15.73.

U.V. (in $CHCl_3$): 264.5 (20,950); 307 (10,600); 394 (30,250).

D. 2-METHYL-1,3,4,5-TETRAHYDRO-5-OXO-BENZ[cd]INDOLE-3-CARBOXYLIC ACID

The N-acetyl-keto acid of C (0.271 g., 1 mole) was dissolved in a solution containing 0.56 g. of potassium hydroxide in 10.7 ml. of water. After standing for 1 hour and 50 minutes the solution was cooled in ice and acidified with concentrated hydrochloric acid. The product was filtered and washed with water to give 0.23 g. of a yellow powder, M.P. 230–232° C. (dec.).

This powder, 2-methyl-1,3,4,5-tetrahydro-5-oxobenz[cd]indole-3-carboxylic acid, was recrystallized from dilute acetic acid and obtained in two forms, namely, yellow prisms (M.P. 238° C. dec.) and pale brown needles (M.P. 235–239° C. dec.). Mixed M.P. of the two forms was 238° C. (dec.). The whole product was analyzed.

*Analysis.*—Calc'd for $C_{13}H_{11}NO_3$: C, 68.11; H, 4.84; N, 6.11. Found: C, 67.91; H, 4.77; N, 5.57.

U.V.: 246 (17,950); 322 (4,140); 369 (4,900); in base: 251 (19,250); 322 (3,800); 374 (4,500).

I.R.: NH: 3310; OH (acid): 3020 sh., 2760 sh., 2660, 2540, 2480 sh.; C=O: 1698 sh., 1690.

E. 2-METHYL-1,3,4,5-TETRAHYDROBENZ[cd]INDOLE-3-CARBOXYLIC ACID

Potassium hydroxide (35.8 g., 0.64 mole) was dissolved in diethylene glycol (320 ml.). The solution was cooled to about 25° C. and 34.8 g. (0.128 mole) of the N-acetyl-keto acid of C was added, followed by 38.4 g. (0.64 mole) of hydrazine hydrate (85%). The mixture was refluxed for 10 minutes.

The inside temperature was then raised to 190° C. and the solution refluxed at that temperature for 10 minutes. It was cooled, 500 ml. of water was added, and the mixture was extracted with three 200-ml. portions of ether. The aqueous solution was cooled in ice and acidified with 140 ml. of concentrated hydrochloric acid. It was then extracted with ten 300-ml. portions of ether. The combined ether extracts were washed with water, saturated aqueous sodium chloride solution, dried with anhydrous sodium sulfate, and evaporated to give a dark oil. The oil was dissolved in chloroform. The solution was treated with decolorizing carbon, filtered, evaporated to about 100 ml., and allowed to crystallize. There was thus obtained 12.7 g. of 2-methyl-1,3,4,5-tetrahydrobenz[cd]indole-3-carboxylic acid in the form of yellow plates, M.P. 173–174° C. The second crop amounted to 1.45 g., M.P. 171–173° C. Total yield, 51%.

A sample was recrystallized from chloroform for analysis; M.P. 174–174.5° C.

*Analysis.*—Calc'd for $C_{13}H_{13}NO_2$: C, 72.54; H, 6.09; N, 6.51. Found: C, 72.96; H, 6.04; N, 6.38.

U.V.: 226 (34,200); f. 275 (7,250); 279 (7,350); f. 290 (5,350).

I.R.: 3340; OH (acid): 3100 sh., 3010 sh., 2720, 2630, 2600, 2540; C=O: 1690; C=C: 1620, 1608; 1573, 1505; C—O/C—N: 1330, 1305, 1240, 1233; OH (deformation): 932; ring: 785, 780, 763, 755, 747, 688.

EXAMPLE 2

*Preparation of Methyl 2-Methyl-1,3,4,5-Tetrahydrobenz-[cd]Indole-3-Carboxylate*

A. 2-METHYL-1,3,4,5-TETRAHYDROBENZ[cd]INDOLE-3-CARBOXYLIC ACID CHLORIDE

A solution of 4.3 g. (0.02 mole) of 2-methyl-1,3,4,5-tetrahydrobenz[cd]indole-3-carboxylic acid in 200 ml. of hot benzene was cooled in ice and oxalyl chloride (20 ml.) was added during 5 minutes, while swirling the mixture. The dark solution was allowed to stand at about 25° C.; gas evolution soon commenced. After 2 hours the solution was evaporated at 40–45° C. under reduced pressure. Benzene (50 ml.) was added and the solution was evaporated as before. The residual 2-methyl-1,3,4,5-tetrahydrobenz[cd]indole-3-carboxylic acid chloride was an oil.

B. METHYL 2-METHYL-1,3,4,5-TETRAHYDRO-BENZ[cd]INDOLE-3-CARBOXYLATE

Methanol (300 ml.) was added to the acid chloride prepared from 0.09 mole of 2-methyl-1,3,4,5-tetrahydrobenz[cd]indole-3-carboxylic acid according to the procedure of A. After the reaction subsided, the suspension was refluxed for 45 minutes. The mixture was allowed to crystallize overnight and afforded 17.34 g. of product obtained in two crops. This product was dissolved in methanol. The solution was treated with decolorizing carbon, filtered, and cooled, to give 13.1 g. of methyl 2 - methyl - 1,3,4,5 - tetrahydrobenz[cd]indole-3-carboxylate melting at 157–158° C. The second crop amounted to 1.54 g., M.P. 156–157° C.; total yield, 71%. An analytical sample obtained by recrystallization from methanol melted at 156.5–157.5° C.

*Analysis.*—Calc'd for $C_{14}H_{15}NO_2$: C, 73.34; H, 6.59; N, 6.11. Found: C, 73.29; H, 6.57; N, 6.06.

U.V.: 225 (35,450); f. 274 (7,300); 279 (7,450); f. 289 (5,300).

I.R.: NH: 3340; C=O: 1705; C=C: 1627, 1612, 1582, 1510; C—O: 1225.

Following the procedure of this example, using the acids of part C and part D of Example 1, there were obtained the methyl esters of 1-acetyl-2-methyl-1,3,4,5-tetrahydro-5-oxobenz[cd]indole-3-carboxylic acid and 2-methyl-1,3,4,5-tetrahydro-5-oxobenz[cd]indole-3-carboxylic acid.

By substituting the methanol by other alkanols, for example, ethanol, 1-butanol, 1-hexanol, and 1-octanol, the corresponding ethyl, butyl, hexyl, and octyl esters of 1-acetyl-2 - methyl-1,3,4,5 - tetrahydro-5 - oxobenz[cd]indole-3-carboxylic acid, 2-methyl-1,3,4,5-tetrahydro-5-oxobenz[cd]indole-3-carboxylic acid, and 2-methyl-1,3,4,5-tetrahydrobenz[cd]indole-3-carboxylic acid were obtained.

EXAMPLE 3

*Preparation of 1-Acetyl-1,3,4,5-Tetrahydro-5-Oxobenz-[cd]Indole-3-Carboxylic Acid, 1,3,4,5-Tetrahydro-5-Oxobenz[cd]Indole-3-Carboxylic Acid, and 1,3,4,5-Tetrahydrobenz[cd]Indole-3-Carboxylic Acid*

A. 1-ACETYL-3-INDOLESUCCINIC ANHYDRIDE

A 3-l., one-neck round-bottom flask equipped with a condenser was charged with 187 g. (0.8 mole) of 3-indolesuccinic acid [recrystallized from water; M.P. 195° C. (dec.)], 1500 ml. of distilled isopropenyl acetate, and p-toluenesulfonic acid (15 g.). The mixture was refluxed for 10 minutes in an oil bath. The condenser was replaced by an 8-inch, glass-helices column attached to a condenser set for distillation. The mixture was heated for three hours, while the distillate was being collected. During the last half hour the temperature of the oil bath was increased from 120° C. to 128° C. and the temperature of the distillate rose from 55–65° C. to 90° C. The distillate amounted to about 300 ml. The dark reaction mixture was evaporated at 40–50° C. in vacuo (water-pump) to dryness. The residue was dissolved in 400 ml. of acetic acid and 50 ml. of acetic anhydride and allowed to crystallize overnight at room temperature (seed). The mixture was filtered, the solid was washed with 100 ml. of acetic acid and with two 100-ml. portions of ether to give a brown solid. The solid was refluxed with 2 l. of benzene and filtered. The insoluble material amounted to 21.5 g., M.P. 169–170° C. (first crop). The benzene filtrate was concentrated to about 1500 ml. when crystallization began in the hot and allowed to stand at room temperature overnight; it was filtered and the solid washed with benzene; 62.7 g., M.P. 170–171° C. (second crop). A third crop was collected by evaporating the mother liquor; 4.84 g., M.P. 169–170° C. Total yield of 1-acetyl-3-indolesuccinic anhydride, 89.04 g. (43.5%).

*Analysis.*—Calc'd for $C_{14}H_{11}NO_4$: C, 65.36; H, 4.31; N, 5.45. Found: C, 65.42; H, 4.17; N, 5.56.

B. 1 - ACETYL - 1,3,4,5 - TETRAHYDRO - 5 - OXOBENZ[cd] INDOLE-3-CARBOXYLIC ACID AND 1,3,4,5-TETRAHYDRO-5-OXOBENZ[cd]INDOLE-3-CARBOXYLIC ACID

A five-liter, three-neck, round-bottom flask equipped with a stirrer and a condenser was charged with 88 g. (0.342 mole) of 1-acetyl-3-indolesuccinic anhydride from A. Ethylene dichloride (1,370 ml.) was added and the suspension was heated on the steam bath until solution resulted. It was then cooled to room temperature. Aluminum chloride (136 g., 1.02 moles) was placed in a 250 ml. Erlenmeyer flask and was added with stirring during a 5–10 minute period through a Gooch tubing. The reaction mixture became warm and an oily complex separated. The mixture was then refluxed on the steam bath for 15 minutes. Stirring became difficult toward the end of this period. The mixture was cooled in an ice bath, 300 g. of ice was added, then a solution of concentrated hydrochloric acid (260 ml.) in 1370 ml. of water. The resulting suspension was stirred for one hour while cooled by an ice bath. (This process breaks up the oily chunks into a nice precipitate.) The suspension was filtered and the solid was sucked as dry as possible. The resulting solid was dissolved in 1 l. of acetone, the solution was treated with 10 g. of decolorizing carbon, filtered, and evaporated to about 100 ml. Methylene chloride (250 ml.) was added and the solution was evaporated to about 100 ml. Crystallization began in the hot and was allowed to proceed at room temperature for a few hours. The crystals were filtered, washed with methylene chloride, and dried in vacuo. There was thus obtained 59.5 g. of 1-acetyl-1,3,4,5-tetrahydro-5-oxobenz[cd]indole-3-carboxylic acid, M.P. 172–173° C. (67.6% yield). This compound has chlorpromazine-like activity and is useful in calming disturbed animals.

*Analysis.*—Calc'd for $C_{14}H_{11}NO_4$: C, 65.36; H, 4.31; N, 5.45. Found: C, 65.64; H, 4.48; N, 5.53.

U.V.: 226 (15,100); 257 (16,800); 292 sh. (8,700); 302.5 (10,750); 326 (3,800).

I.R.: OH: 3600, 3470, 3080, 2720, 2600; C=O: 1725, 1715, 1680, 1670, 1655 sh.; C=C: 1503, 1575, 1498; OH deformation: 900; aromatic: 860, 790, 782, 760, 713, 686.

On hydrolysis of the above N-acetyl-keto acid by the procedure of Example 1, part D, there is obtained 1,3,4,5-tetrahydro-5-oxobenz[cd]indole-3-carboxylic acid.

C. 1,3,4,5-TETRAHYDROBENZ[cd]INDOLE-3-CARBOXYLIC ACID

Potassium hydroxide (8.18 g.; 0.146 mole) was dissolved in 73.5 ml. of diethylene glycol by heating. The solution was cooled and 7.53 g. (0.0293 mole) of the N-acetyl-keto acid of B and 7.3 g. (0.146 mole) of 85% aqueous hydrazine hydrate were added. The solution was refluxed for 10 min. The condenser was then removed and the solution was evaporated until the inside temperature reached 190° C. and was then heated for 10 min. It was cooled and 200 ml. of water was added. The solution was extracted with ether (five 100-ml. portions). The aqueous layer was cooled in ice and acidified with 40 ml. of concentrated hydrochloric acid. The acidified solution was extracted with ether (five 200-ml. portions), the extracts were washed with water, treated with decolorizing carbon and the resulting pale yellow solution was dried with anhydrous sodium sulfate and evaporated to give 1.8 g. of a crude yellow solid. Crystallization from chloroform afforded 0.45 g. (7.6% yield) of 1,3,4,5-tetrahydrobenz[cd]indole-3-carboxylic acid; M.P. 203° C. (dec.), unchanged on recrystallization from chloroform.

*Analysis.*—Calc'd for $C_{12}H_{11}NO_2$: C, 71.62; H, 5.51; N, 6.96. Found: C, 71.66; H, 5.66; N, 7.22.

U.V.: 223 (33,400); 274 (4,750); 280 (5,900); 291 (4,560).

I.R.: NH: 3390; OH: 3000, 2700, 2620; C=O: 1688; C=C: 1608, 1512; OH deformation: 930–915; aromatic substitution: 795, 785, 770, 765, 750, 710.

On heating at 210° C. for five minutes, the acid was decarboxylated to 1,3,4,5-tetrahydrobenz[cd]indole, a known compound (Uhle, J. Am. Chem. Soc. 71, 761–6, 1949) useful as an ultraviolet opacifier in suntan lotions because of its absorption in the range of 280–300 millimicrons.

EXAMPLE 4

*Preparation of Methyl 1-Acetyl-1,3,4,5-Tetrahydro-5-Oxobenz[cd]Indole-3-Carboxylate*

A. WITH DIAZOMETHANE

A solution of 1-acetyl-1,3,4,5-tetrahydro-5-oxobenz-[cd]indole-3-carboxylic acid (5.14 g., 0.02 mole) in methanol was added to an ethereal solution of diazomethane prepared from 8 g. (0.057 mole) of N-methyl-N-nitroso-N'-nitroguanidine while cooling in ice. At the end of the addition the yellow color disappeared, indicating an insufficient amount of diazomethane. A further quantity of diazomethane (from 3 g. of the quanidine) was added and the yellow color persisted. The solution was evaporated to about 30 ml. and allowed to crystallize overnight. The crystals were filtered and washed with ether to obtain 2.26 g. of methyl 1-acetyl-1,3,4,5-tetrahydro-5-oxobenz[cd]indole-3-carboxylate, M.P. 121–123° C. A second crop was collected from the filtrate to bring the total yield to 55%.

A sample was recrystallized from methanol for analysis; M.P. 123–124° C.

*Analysis.*—Calc'd for $C_{15}H_{13}NO_4$: C, 66.41; H, 4.83; N, 516. Found: C, 66.15; H, 4.39; N, 4.84.

U.V.: 226 (15,650); 256 (17,350); sh. 292 (9,250); 302 (11,200); sh. 328 (3,900).

B. WITH OXALYL CHLORIDE

Oxalyl chloride (40 ml., 0.47 mole) was added during 15 minutes to a suspension of the above acid (10.30 g., 0.04 mole) in 400 ml. of benzene while stirring and refluxing. The mixture was refluxed for an additional 15 minutes and the solution was allowed to stand at room temperature for 2 hours. It was then evaporated to dryness in vacuo at 50–60° C. The residue was flushed twice with 50-ml. portions of benzene. The residue was suspended in 600 ml. of methanol, the suspension was refluxed for 15 minutes, and the resulting solution was evaporated to about 50 ml. in vacuo. The suspension was filtered and the product was washed with cold methanol; 7.1 g., M.P. 121–122° C., identical with the product obtained in A. The second crop amounted to 1.09 g., M.P. 120–121° C. Yield: 75.5%.

Following the procedure of this example, using the acids of part B and part C of Example 3, there were obtained the methyl esters of 1,3,4,5-tetrahydro-5-oxobenz-[cd]indole-3-carboxylic acid and 1,3,4,5-tetrahydrobenz-[cd]indole-3-carboxylic acid.

By substituting the methanol by other alkanols, for example, ethanol, 1-butanol, 1-hexanol, and 1-octanol, the corresponding ethyl, butyl, hexyl, and octyl esters of 1-acetyl-1,3,4,5-tetrahydro-5-oxobenz[cd]indole-3-carboxylic acid, 1,3,4,5-tetrahydro-5-oxobenz[cd]indole-3-carboxylic acid, and 1,3,4,5-tetrahydrobenz[cd]indole-3-carboxylic acid were obtained.

In place of 3-indolesuccinic acid and 2-methyl-3-indolesuccinic acid used in the foregoing examples, there may be substituted other 3-indolesuccinic acids. The following examples are illustrative.

EXAMPLE 5

*Preparation of 1,2-Dimethyl-1,3,4,5-Tetrahydro-5-Oxobenz[cd]Indole-3-Carboxylic Acid, 1,2-Dimethyl-1,3,4,5-Tetrahydrobenz[cd]Indole-3-Carboxylic Acid and Esters Thereof*

A. 1,2-DIMETHYLINDOLE

A mixture of 10.0 g. of sodium hydroxide and 100 ml. of dimethylformamide was cooled to approximately −50° C., and a solution of 52.4 g. of 2-methylindole and 160 ml. of dimethylformamide was added over a 30-minute period. When the evolution of hydrogen ceased 59.4 g. of methyl iodide was added over 30 minutes. The mixture was allowed to stand and warm to 25° C. The mixture was cautiously treated with 18.4 ml. of ethanol and filtered. The solid was washed with 50 ml. of dimethylformamide. The filtrates were combined and poured into 900 ml. of water. The mixture was refrigerated for 2 hr. and filtered. The precipitate was recovered and recrystallized from about 200 ml. of 90% methanol and then from 600 ml. of 50% methanol. The product, 1,2-dimethylindole, weighed 40.0 g. and melted at 57–59° C.

B. 1,2-DIMETHYL-3-INDOLESUCCINIC ACID

A mixture of 29.0 g. of 1,2-dimethylindole and 23.2 g. of maleic acid was warmed on the steam bath until a reaction commenced. The resulting solid was cooled and shaken with a solution of 16.0 g. of sodium hydroxide and 200 ml. of water. The mixture was extracted with ether and the layers were separated. The water layer was acidified, cooled, and filtered. The resulting solid was dissolved in 1500 ml. of 30% ethanol, mixed with decolorizing carbon, filtered, and upon cooling 21.2 g. of 1,2-dimethyl-3-indolesuccinic acid was obtained.

When 1,2-dimethyl-3-indolesuccinic acid was used in place of 2-methyl-3-indolesuccinic acid in Example 1, there were obtained 1,2-dimethyl-3-indolesuccinic anhydride, 1,2-dimethyl-1,3,4,5-tetrahydro-5-oxobenz[cd]-indole-3-carboxylic acid, and 1,2-dimethyl-1,3,4,5-tetrahydrobenz[cd]indole-3-carboxylic acid. By following the procedures of Examples 2 and 4, the corresponding alkyl esters of these acids were obtained.

EXAMPLE 6

*Preparation of 1-Acetyl-2-(p-Anisyl)-1,3,4,5-Tetrahydro-5-Oxobenz[cd]Indole-3-Carboxylic Acid, 2-(p-Anisyl)-1,3,4,5-Tetrahydro-5-Oxobenz[cd]Indole-3-Carboxylic Acid, 2-p-(Anisyl)-1,3,4,5-Tetrahydrobenz[cd]Indole-3-Carboxylic Acid and Esters Thereof*

A. 2-(p-ANISYL)INDOLE

A mixture of 17.5 g. of p-methoxyacetophenone and 5 ml. of phenylhydrazine was heated on the steam bath for 10 minutes. It was then cooled to 25° C. and 20 g. of polyphosphoric acid was added. It was then heated to 60° C. (oil-bath temperature). When the internal temperature reached 140° C., the oil bath was removed and the temperature was allowed to rise to 200° C., at which point the mixture was cooled in ice to 180° C. and then further allowed to cool to 100° C. Water (100 ml.) was added and the mixture was heated on the steam bath for 15 minutes. The resulting suspension was cooled, filtered, and the product was crystallized from ethanol, to yield 2-(p-anisyl)indole which melted at 229.5–230.5° C. Recrystallization from benzene gave colorless plates which melted at 230–231.5° C.

B. 2-(p-ANISYL)-3-INDOLESUCCINIC ANHYDRIDE

A mixture of 90.3 g. of 2-(p-anisyl)indole, 198.0 g. of maleic anhydride, and 810 ml. of acetic acid was refluxed for 30 minutes. The solution upon being cooled deposited 2-(p-anisyl)-3-indolesuccinic anhydride which was recovered by filtration, washed successively with acetic acid and ether, and dried; melting point, 236.5–238° C.; weight, 93.9 g.

By substituting 2-(p-anisyl)-3-indolesuccinic anhydride for the 2-methyl-3-indolesuccinic acid in Example 1, there were obtained 1-acetyl-2-(p-anisyl)-3-indolesuccinic anhydride, 1-acetyl-2-(p-anisyl)-1,3,4,5-tetrahydro - 5 - oxobenz[cd]indole-3-carboxylic acid, 2-(p-anisyl)-1,3,4,5-tetrahydro-5-oxobenz[cd]indole-3-carboxylic acid, and 2-(p - anisyl) - 1,3,4,5 - tetrahydrobenz[cd]indole - 3 - carboxylic acid. By following the procedures of Examples 2 and 4, the corresponding alkyl esters of these acids were obtained.

EXAMPLE 7

*Preparation of 1-Methyl-2-(p-Anisyl)-1,3,4,5-Tetrahydro-5-Oxobenz[cd]Indole-3-Carboxylic Acid, 1-Methyl-2-(p-Anisyl)-1,3,4,5-Tetrahydrobenz[cd]Indole - 3 - Carboxylic Acid and Esters Thereof*

A. 1-METHYL-2-(p-ANISYL)INDOLE

A mixture of 100 g. of p-methoxyacetophenone and 81.2 g. of 1-methyl-1-phenylhydrazine was heated on the steam bath for one hour. A solution consisting of 1590 ml. of acetic acid and 380 ml. of sulfuric acid was added and the mixture was heated on the steam bath for 4 hr. The resulting brown solution was cooled and was then added to 1000 g. of ice and 2500 ml. of water. The resulting product was recovered by filtration and washed with water. Recrystallization from methanol gave 27 g. of 1-methyl-2-(p-anisyl)indole, which on another recrystallization from methanol melted at 119.5–120.5° C.

*Analysis.*—Calc'd for $C_{16}H_{15}NO$: C, 80.98; H, 6.37; N, 5.90. Found: C, 81.02; H, 6.27; N, 5.70.

B. 1-METHYL-2-(p-ANISYL)-3-INDOLE-SUCCINIC ANHYDRIDE

In the same manner as shown in Example 6, Part B, 1-methyl-2-(p-anisyl)-3-indolesuccinic anhydride was prepared by using 1-methyl-2-(p-anisyl)indole instead of 2-(p-anisyl)indole. The compound melted at 235.5–237° C.

By substituting the 1-acetyl-2-methyl-3-indolesuccinic anhydride in Example 1 by 1-methyl-2-(p-anisyl)-3-indolesuccinic anhydride, there were obtained 1-methyl-2-(p-anisyl) - 1,3,4,5 - tetrahydro-5-oxobenz[cd]indole-3-carboxylic acid and 1-methyl-2-(p-anisyl)1,3,4,5-tetrahydrobenz[cd]indole-3-carboxylic acid. By following the procedures of Examples 2 and 4, the corresponding alkyl esters of these acids were obtained.

EXAMPLE 8

*Preparation of 1-Acetyl-2-(3,4,5-Trimethoxyphenyl)-1,3,4,5-Tetrahydro - 5 - Oxobenz[cd]Indole-3-Carboxylic Acid, 2-(3,4,5-Trimethoxyphenyl)-1,3,4,5-Tetrahydro-5-Oxobenz[cd]Indole-3-Carboxylic Acid, 2-(3,4,5-Trimethoxyphenyl)-1,3,4,5 - Tetrahydrobenz[cd]Indole-3-Carboxylic Acid and Esters Thereof*

A. 2-(3,4,5-TRIMETHOXYPHENYL)INDOLE 3,4,5-trimethoxyacetophenone was prepared by treating 3,4,5-trimethoxybenzoyl chloride (Perkin et al., J. Chem. Soc. 1906, 1655) with cadmium chloride and methyl magnesium iodide according to the procedure of Horning et al., J. Amer. Chem. Soc. 73, 5826, 1961.

A mixture of 10.8 g. of phenylhydrazine and 21 g. of 3,4,5-trimethoxyacetophenone was heated on the steam bath. A solution resulted which then solidified. It was cooled to about 25° C. and 41 g. of polyphosphoric acid was added. The mixture was heated on the steam bath with occasional stirring for one hour. The initially formed solution solidified, 400 ml. of water was then added, and the mixture was again heated on the steam bath for one-half hour. The resulting precipitate was recovered by filtration and washed with water. The washed precipitate was dissolved in 550 ml. of methanol and 100 ml. of acetone and the resulting mixture was treated with decolorizing carbon and filtered. The filtrate was evaporated until crystallization started. After crystallization was complete there was obtained 14.2 g. of 2-(3,4,5-trimethoxyphenyl)indole which melted at 205–206.5° C. On recrystallization from methanolacetone the compound melted at 205.5–206.5° C.

*Analysis.*—Calc'd for $C_{17}H_{17}NO_3$: C, 72.06; H, 6.05; N, 4.94; $OCH_3$, 32.86. Found: C, 71.74; H, 6.05; N, 5.01; $OCH_3$, 34.99.

B. 2-(3,4,5-TRIMETHOXYPHENYL)-3-INDOLE-SUCCINIC ACID

A finely ground mixture of 17.4 g. of 2-(3,4,5-trimethoxyphenyl)indole and 7.14 g. of maleic acid was heated in an oil bath. Reaction began at 140° C. and the temperature was raised to 175° C. during fifteen minutes. The dark green, solid reaction mixture was cooled, treated with a solution of 13.5 g. of potassium hydroxide in 155 ml. of water, and heated on the steam bath with stirring for 2 hr. The reaction mixture was filtered and the filtrate was treated with decolorizing carbon, cooled in ice, and acidified with 36 ml. of concentrated hydrochloric acid. The resulting suspension was extracted twice with 200-ml. portions of ethyl acetate. The extracts were washed with saturated aqueous sodium chloride solution, and dried with anhydrous sodium sulfate. After treatment with decolorizing carbon the dark yellow solution was evaporated to dryness to give 15.6 g. of 2-(3,4,5-trimethoxyphenyl)-3-indolesuccinic acid.

By substituting the 2-methyl-3-indolesuccinic acid in Example 1 by 2-(3,4,5-trimethoxyphenyl)-3-indolesuccinic acid, there were obtained 1-acetyl-2-(3,4,5-trimethoxyphenyl)-3-indolesuccinic anhydride, 1-acetyl-2-(3,4,5-trimethoxyphenyl)-1,3,4,5-tetrahydro - 5 - oxobenz[cd]indole-3-carboxylic acid, 2-(3,4,5-trimethoxyphenyl)-1,3,4,5-tetrahydro-5-oxobenz[cd]indole-3-carboxylic acid, and 2-(3,4,5-trimethoxyphenyl)-1,3,4,5 - tetrahydrobenz[cd]indole-3-carboxylic acid. Following the procedures of Examples 2 and 4, the corresponding alkyl esters of these acids were obtained.

EXAMPLE 9

*Preparation of 1-Acetyl-2-(p-Hydroxyphenyl)-1,3,4,5-Tetrahydro-5-Oxobenz[cd]Indole-3-Carboxylic Acid, 2-p-Hydroxyphenyl)-1,3,4,5 - Tetrahydro-5-Oxobenz[cd]Indole-3-Carboxylic Acid, 2-(p-Hydroxyphenyl)-1,3,4,5-Tetrahydrobenz[cd]Indole-3-Carboxylic Acid and Esters Thereof*

A. 2-(p-HYDROXYPHENYL)INDOLE

A mixture of 2.23 g. of 2-(p-anisyl)indole and 5.75 g. of pyridine hydrochloride was heated at 200–215° C. for 35 minutes. The dark solution was cooled, 75 ml. of water was added, and the solid was broken up until a suspension resulted. The gray precipitate was filtered, washed with water, and refluxed with 250 ml. of benzene. The mixture was then filtered and the filtrate was evaporated to produce 1.45 g. of 2-(p-hydroxyphenyl)indole which melted at 228–231° C. On recrystallization from benzene the compound melted at 231.5–232.5° C.

*Analysis.*—Calc'd for $C_{14}H_{11}NO$: C, 80.36; H, 5.30; N, 6.69. Found: C, 80.27; H, 5.35; N, 6.61.

B. 2-(p-HYDROXYPHENYL)-3-INDOLESUCCINIC ACID

A finely ground mixture of 16.5 g. of 2-(p-hydroxyphenyl)indole and 9.16 g. of maleic acid was heated in an oil-bath. The reaction started at 143° C. and the temperature was raised to 178° C. during 15 minutes and maintained for about 3 minutes while the mixture was stirred with a glass rod. The mixture was cooled and a solution of 15 g. of potassium hydroxide in 300 ml. of water was added. The resulting brown solution was treated with decolorizing carbon, filtered, and acidified with concentrated hydrochloric acid, whereupon a gummy solid precipitated. The mixture was extracted three times with ethyl acetate, the extracts were washed with saturated aqueous sodium chloride solution, dried with anhydrous sodium sulfate, treated with decolorizing carbon, and evaporated under reduced pressure at 25° C. to give 25.65 g. of 2-(p-hydroxyphenyl)-3-indolesuccinic acid.

By substituting 2-methyl-3-indolesuccinic acid in Example 1 by 2-(p-hydroxyphenyl)-3-indolesuccinic acid, there were obtained 1-acetyl-2-(p-hydroxyphenyl)-3-indolesuccinic anhydride, 1-acetyl-2-(p-hydroxyphenyl)-1,3,4,5-tetrahydro-5-oxobenz[cd]indole-3-carboxylic acid, 2-(p-hydroxyphenyl)-1,3,4,5-tetrahydro - 5 - oxobenz[cd]indole-3-carboxylic acid, and 2-(p-hydroxyphenyl)-1,3,4,5-tetrahydrobenz[cd]indole-3-carboxylic acid. By following the procedures of Examples 2 and 4, the corresponding alkyl esters of these acids were obtained.

EXAMPLE 10

*Preparation of 1-Acetyl-2-(p-Fluorophenyl)-1,3,4,5-Tetrahydro-5-Oxobenz[cd]Indole-3-Carboxylic Acid, 2-(p-Fluorophenyl) - 1,3,4,5 - Tetrahydro - 5 - Oxobenz[cd] Indole-3-Carboxylic Acid, 2-(p-Fluorophenyl)-1,3,4,5-Tetrahydrobenz[cd]Indole-3-Carboxylic Acid and Esters Thereof*

A. 2-(p-FLUOROPHENYL)INDOLE

A mixture of 10.8 g. of phenylhydrazine and 14.8 g. of p-fluoroacetophenone was heated on the steam bath for 20 minutes. The resulting solution was cooled to 25° C. whereupon a solid resulted. 41 g. of polyphosphoric acid was added and the mixture was stirred. The temperature rose to 75° C. and after a few minutes the reaction mixture was heated on the steam bath. When the inside temperature reached 95° C. a vigorous reaction took place. The flask was immediately immersed in ice and the temperature rose to 120° C. When the temperature began to drop after a few minutes, the mixture was again heated on the steam bath for one-half hour. 200 ml. of water was added and after heating for 5 minutes on the steam bath a suspension resulted. The suspension was filtered and the brown solid was washed with water. The compound was recrystallized from benzene to give 14.2 g. of 2-(p-fluorophenyl) indole which melted at 190–191° C. On recrystallization from benzene the compound melted at 188.5–189.5° C.

*Analysis.*—Calc'd for $C_{14}H_{10}FN$: C, 79.60; H, 4.77; F, 8.99; N, 6.63. Found: C, 79.40; H, 4.69; F, 9.20; N, 6.90.

B. 2-(p-FLUOROPHENYL)-3-INDOLESUCCINIC ACID

A finely ground mixture of 4.65 g. of 2-(p-fluorophenyl)indole and 2.55 g. of maleic acid was heated in an oil bath. Reaction started at 145° C. and the temperature was raised to 160° C. during 15 minutes. The mixture was cooled, a solution of 4.85 g. of potassium hydroxide in 55 ml. of water was added, and the suspension was heated for 1 hour on the steam bath. It was then filtered and the filtrate was treated with decolorizing carbon, cooled in ice, and acidified with 10 ml. of concentrated hydrochloric acid. The resulting suspension was extracted twice with ethyl acetate. The extracts were washed with water, saturated aqueous sodium chloride solution, dried with anhydrous sodium sulfate, treated with decolorizing carbon, and evaporated under reduced pressure at 25° C., to produce 4.0 g. of 2-(p-fluorophenyl)-3-indolesuccinic acid.

By substituting 2-methyl-3-indolesuccinic acid in Example 1 by 2-(p-fluorophenyl)-3-indolesuccinic acid, there were obtained 1-acetyl-2-(p-fluorophenyl)-3-indolesuccinic anhydride, 1-acetyl-2-(p-fluorophenyl)-1,3,4,5-tetrahydro-5-oxobenz[cd]indole-3-carboxylic acid, 2-(p-fluorophenyl)-1,3,4,5-tetrahydro-5 - oxobenz[cd]indole-3-carboxylic acid, and 2-(p-fluorophenyl)-1,3,4,5-tetrahydrobenz[cd]indole-3-carboxylic acid. By following the procedures of Examples 2 and 4, the corresponding alkyl esters of these acids were obtained.

EXAMPLE 11

By substituting the 1,2-dimethyl-3-indolesuccinic acid in Example 5 by 1-ethyl-2-(p-ethoxyphenyl)-5-benzyloxy-3-indolesuccinic acid, there were obtained 1-ethyl-2-(p-ethoxyphenyl)-5-benzyloxy-3-indolesuccinic anhydride, 1-ethyl-2-(p-ethoxyphenyl)-6-benzyloxy-1,3,4,5-tetrahydro-5-oxobenz[cd]indole-3-carboxylic acid, and 1-ethyl-2-(p-ethoxyphenyl)-6-benzyloxy - 1,3,4,5 - tetrahydrobenz[cd] indole-3-carboxylic acid. By following the procedures of Examples 2 and 4, the corresponding alkyl esters of these acids were obtained. By hydrogenolysis according to the procedure of U.S. Patent 2,708,197, the corresponding 6-hydroxy acids and esters were obtained.

EXAMPLE 12

By substituting the 1,2-dimethyl-3-indolesuccinic acid in Example 5 by 1-propyl-2-(p-propoxyphenyl)-6-methoxy-3-indolesuccinic acid, there were obtained 1-propyl-2-(p-propoxyphenyl)-6-methoxy-3 - indolesuccinic anhydride, 1-propyl-2-(p-propoxyphenyl)-7-methoxy-1,3,4,5-tetrahydro-5-oxobenz[cd]indole-3-carboxylic acid, and 1-propyl-2-(p-propoxyphenyl)-7-methoxy-1,3,4,5-tetrahydrobenz[cd]indole-3-carboxylic acid. By following the procedures of Examples 2 and 4, the corresponding alkyl esters of these acids were obtained.

EXAMPLE 13

By substituting the 1,2-dimethyl-3-indolesuccinic acid in Example 5 by 1-butyl-2-(p-butoxyphenyl)-7-benzyloxy-indole-3-succinic acid, there were obtained 1-butyl-2-(p-butoxyphenyl)-7-benzyloxy-3-indolesuccinic anhydride, 1-butyl-2-(p-butoxyphenyl)-8-benzyloxy-1,3,4,5-tetrahydro-5-oxobenz[cd]indole-3-carboxylic acid, and 1-butyl-2-(p-butoxyphenyl)-8-benzyloxy - 1,3,4,5 - tetrahydrobenz[cd] indole-3-carboxylic acid. By following the procedures of Examples 2 and 4, the corresponding alkyl esters of these acids were obtained. By hydrogenolysis according to the procedure of U.S. Patent 2,708,197, the corresponding 8-hydroxy acids and esters were obtained.

EXAMPLE 14

By substituting the 1,2-dimethyl-3-indolesuccinic acid in Example 5 by 1,2-diethyl-5-ethoxy-3-indolesuccinic acid, there were obtained 1,2-diethyl-5-ethoxy-3-indolesuccinic anhydride, 1,2-diethyl-6-ethoxy-1,3,4,5-tetrahydro-5-oxobenz[cd]indole-3-carboxylic acid, and 1,2-diethyl-6-ethoxy - 1,3,4,5 - tetrahydrobenz[cd]indole-3-carboxylic acid. By following the procedures of Examples 2 and 4, the corresponding alkyl esters of these acids were obtained.

EXAMPLE 15

By substituting the 2-methyl-3-indolesuccinic acid in Example 1 by 2-propyl-6-propoxy-3-indolesuccinic acid, there were obtained 1-acetyl-2-propyl-6-propoxy-3-indolesuccinic anhydride, 1-acetyl-2-propyl-7-propoxy-1,3,4,5-tetrahydro-5-oxobenz[cd]indole-3-carboxylic acid, 2-propyl - 7 - propoxy - 1,3,4,5 - tetrahydro - 5 - oxobenz[cd]-indole-3-carboxylic acid, and 2-propyl-7-propoxy-1,3,4,5-tetrahydrobenz[cd]indole-3-carboxylic acid. By following the procedures of Examples 2 and 4, the corresponding alkyl esters of these acids were obtained.

EXAMPLE 16

By substituting the 1,2-dimethyl-3-indolesuccinic acid in Example 5 by 1,2-dibutyl-5-butoxy-3-indolesuccinic acid, there were obtained 1,2-dibutyl-5-butoxy-3-indolesuccinic anhydride, 1,2-dibutyl-6-butoxy-1,3,4,5-tetrahydro-5-oxobenz[cd]indole-3-carboxylic acid, and 1,2,-dibutyl - 6 - butoxy - 1,3,4,5 - tetrahydrobenz[cd] - 3 - carboxylic acid. By following the procedures of Examples 2 and 4, the corresponding alkyl esters of these acids were obtained.

EXAMPLE 17

By substituting the 2-methyl-3-indolesuccinic acid in Example 1 by 2-(3,4-diethoxyphenyl)-3-indolesuccinic acid, there were obtained 1-acetyl-2-(3,4-diethoxyphenol)-3- indole succinic anhydride, 1-acetyl-2-(3,4-diethoxyphenyl)-1,3,4,5 - tetrahydro - 5 - oxobenz[cd]indole - 3 - carboxylic acid, 2-(3,4-diethoxyphenyl)-1,3,4,5-tetrahydro-5-oxobenz[cd]indole-3-carboxylic acid, and 2-(3,4-diethoxyphenyl) - 1,3,4,5 - tetrahydrobenz[cd]indole - 3 - carboxylic acid. By following the procedures of Examples 2 and 4, the corresponding alkyl esters of these acids were obtained.

EXAMPLE 18

By substituting the 1,2-dimethyl-3-indolesuccinic acid in Example 5 by 1-methyl-2-(3,4-dipropoxyphenyl)-3-indolesuccinic acid, there were obtained 1-methyl-2-(3,4-dipropoxyphenyl)-3-indolesuccinic anhydride, 1-methyl-2 - (3,4 - dipropoxyphenyl) - 1,3,4,5 - tetrahydro - 5 - oxobenz[cd]indole-3- carboxylic acid, and 1-methyl-2-(3,4-dipropoxyphenyl) - 1,3,4,5 - tetrahydrobenz[cd]indole - 3- carboxylic acid. By following the procedures of Examples 2 and 4, the corresponding alkyl esters of these acids were obtained.

EXAMPLE 19

By substituting the 2-methyl-3-indolesuccinic acid in Example 1 by 2-(3,4-dibromophenyl)-3-indolesuccinic acid, there were obtained 1-acetyl-2-(3,4-dibromophenyl)-3-indolesuccinic anhydride, 1-acetyl-2-(3,4-dibromophenyl) - 1,3,4,5 - tetrahydro - 5 - oxobenz[cd]indole - 3 - carboxylic acid, 2-(3,4-dibromophenyl)-1,3,4,5-tetrahydro-5-oxobenz[cd]indole-3-carboxylic acid, and 2-(3,4-dibromophenyl) - 1,3,4,5 - tetrahydrobenz[cd]indole - 3 - carboxylic acid. By following the procedures of Examples 2 and 4, the corresponding alkyl esters of these acids were obtained.

EXAMPLE 20

By substituting the 1,2-dimethyl-3-indolesuccinic acid in Example 5 by 1-propyl-2-(3,4-diiodophenyl)-3-indolesuccinic acid, there were obtained 1-propyl-2-(3,4-diiodophenyl)-3-indolesuccinic anhydride, 1-propyl-2-(3,4-diiodophenyl) - 1,3,4,5 - tetrahydro - 5 - oxobenz[cd]indole-3-carboxylic acid, and 1-propyl-2-(3,4-diiodophenyl)-1,3,4,5-tetrahydrobenz[cd]indole-3-carboxylic acid. By following the procedures of Examples 2 and 4, the corresponding alkyl esters of these acids were obtained.

EXAMPLE 21

By substituting the 1,2-dimethyl-3-indolesuccinic acid in Example 5 by 1-ethyl-2-(3,4-dihydroxyphenyl)-3-indolesuccinic acid, there were obtained 1-ethyl-2-(3,4-dihydroxyphenyl)-3-indolesuccinic anhydride, 1-ethyl-2-(3,4-dihydroxyphenyl) - 1,3,4,5 - tetrahydro - 5 - oxobenz[cd]indole-3-carboxylic acid, and 1-ethyl-2-(3,4-dihydroxyphenyl) - 1,3,4,5 - tetrahydrobenz[cd]indole - 3-carboxylic acid. By following the procedures of Examples 2 and 4, the corresponding alkyl esters of these acids were obtained.

EXAMPLE 22

By substituting the 2-methyl-3-indolesuccinic acid in Example 1 by 2-phenyl-3-indolesuccinic acid, there were obtained 1-acetyl-2-phenyl-3-indolesuccinic anhydride, 1-acetyl - 2 - phenyl - 1,3,4,5 - tetrahydro - 5 - oxobenz[cd]-indole-3-carboxylic acid, 2-phenyl-1,3,4,5-tetrahydro-5-oxobenz[cd]indole-3-carboxylic acid, and 2-phenyl-1,3,4,5-tetrahydrobenz[cd]indole-3-carboxylic acid. By following the procedures of Examples 2 and 4, the corresponding alkyl esters of these acids were obtained.

EXAMPLE 23

By substituting the 1,2-dimethyl-3-indolesuccinic acid in Example 5 by 1-methyl-3-indolesuccinic acid, there were obtained 1-methyl-3-indolesuccinic anhydride, 1-methyl - 1,3,4,5 - tetrahydro - 5 - oxobenz[cd]indole - 3-carboxylic acid, and 1-methyl-1,3,4,5-tetrahydrobenz[cd]indole-3-carboxylic acid. By following the procedures of Examples 2 and 4, the corresponding alkyl esters of these acids are obtained.

EXAMPLE 24

By substituting the 3-indolesuccinic acid in Example 3 by 5-benzyloxy-3-indolesuccinic acid, there were obtained 1-acetyl-5-benzyloxy-3-indolesuccinic anhydride, 1-acetyl-6 - benzyloxy - 1,3,4,5 - tetrahydro - 5 - oxobenz[cd]indole-3-carboxylic acid, 6-benzyloxy-1,3,4,5-tetrahydro-5-oxobenz[cd]indole-3-carboxylic acid, and 6-benzyloxy-1, 3,4,5-tetrahydrobenz[cd]indole-3-carboxylic acid. By following the procedures of Examples 2 and 4, the corresponding alkyl esters of the 6-benzyloxy acids were obtained. By hydrogenolysis according to U.S. Patent 2,708,-197 there were obtained the corresponding 6-hydroxy acids and esters.

EXAMPLE 28

By substituting the 2-methyl-3-indolesuccinic acid in Example 1 by 2-methyl-5-benzyloxy-3-indolesuccinic acid, there were obtained 1-acetyl-2-methyl-5-benzyloxy-3-indolesuccinic anhydride, 1-acetyl-2-methyl-6-benzyloxy-1, 3,4,5 - tetrahydro - 5 - oxobenz[cd]indole - 3 - carboxylic acid, 2-methyl-6-benzyloxy-1,3,4,5-tetrahydro-5-oxobenz[cd]indole-3-carboxylic acid, and 2-methyl-6-benzyloxy-1,3,4,5-tetrahydrobenz[cd]indole-3-carboxylic acid. By following the procedures of Examples 2 and 4, the corresponding alkyl esters of these acids were obtained. By hydrogenolysis according to U.S. Patent 2,708,197 there were obtained the corresponding 6-hydroxy acids and esters.

EXAMPLE 26

By substituting the 1,2-dimethyl-3-indolesuccinic acid in Example 5 by 1-benzyl-3-indolesuccinic acid, there were obtained 1-benzyl-3-indolesuccinic anhydride, 1-benzyl-1,3,4,5-tetrahydro-5-oxobenz[cd]indole - 3 - carboxylic acid, and 1-benzyl-1,3,4,5-tetrahydrobenz[cd]indole-3-carboxylic acid. By following the procedures of Examples 2 and 4, the corresponding alkyl esters of these acids were obtained.

The corresponding substituted benzyl compounds were obtained by substituting 1-benzyl-3-indolesuccinic acid by 1-(p-methylbenzyl-, 1-(p-chlorobenzyl-, and 1-(p-methoxybenzyl)-3-indolesuccinic acids.

EXAMPLE 27

By substituting the 3-indolesuccinic acid in Example 3 by 5-chloro-3-indolesuccinic acid, there were obtained 1-acetyl-5-chloro-3-indolesuccinic anhydride, 1-acetyl-6-chloro-1,3,4,5-tetrahydro-5-oxobenz[cd]indole - 3 - carboxylic acid, 6-chloro-1,3,4,5-tetrahydro-5-oxobenz[cd]indole-3-carboxylic acid, and 6-chloro-1,3,4,5-tetrahydrobenz[cd]indole-3-carboxylic acid. By following the procedures of Examples 2 and 4, the corresponding alkyl esters of the 6-chloro acids were obtained.

By substituting the 5-chloro-3-indolesuccinic acid by 5-methyl-, 5,7-dichloro-2-methyl-, 5,6-dimethoxy-, 5,6-dibromo-, 5-ethoxy-, and 5-fluoro-2-methyl-3-indolesuccinic acids, there were obtained the corresponding 6-methyl-, 6,8-dichloro-2-methyl-, 6,7-dimethoxy-, 6,7-dibromo-, 6-ethoxy-, and 6-fluoro-2-methyl- compounds.

I claim:
1. A compound of the formula

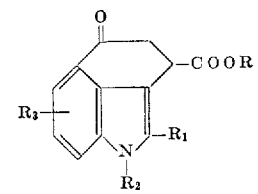

(I)

wherein R is selected from the group consisting of hydrogen and lower-alkyl; $R_1$ is selected from the group consisting of hydrogen, alkyl of from 1 to 4 carbon atoms, inclusive, phenyl, hydroxyphenyl, alkoxyphenyl wherein alkoxy is of from 1 to 4 carbon atoms, inclusive, and halophenyl; $R_2$ is selected from the group consisting of hydrogen, alkanoyl of from 1 to 4 carbon atoms, inclusive, benzyl and halobenzyl which can be substituted with alkyl or alkoxy of from 1 to 4 carbon atoms, inclusive, and alkyl of from 1 to 4 carbon atoms, inclusive; and $R_3$ is selected from the group consisting of hydrogen, hydroxy, benzyloxy, alkyl of from 1 to 4 carbon atoms, inclusive, halogen, and alkoxy of from 1 to 4 carbon atoms, inclusive.

2. 1-acetyl-2-lower - alkyl-1,3,4,5-tetrahydro-5-oxobenz[cd]indole-3-carboxylic acid.

3. 1 - acetyl-2-methyl-1,3,4,5-tetrahydro-5-oxobenz[cd]indole-3-carboxylic acid.

4. 2-lower-alkyl-1,3,4,5-tetrahydro - 5 - oxobenz[cd]indole-3-carboxylic acid.

5. 2-methyl-1,3,4,5-tetrahydro-5-oxobenz[cd]indole - 3 - carboxylic acid.

6. 1-acetyl-1,3,4,5-tetrahydro-5-oxobenz[cd]indole - 3 - carboxylic acid.

7. 1,3,4,5-tetrahydro-5-oxobenz[cd]indole-3-carboxylic acid.

8. A compound of the formula

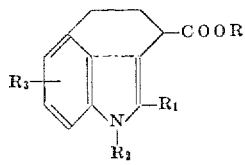

(IV)

wherein R is selected from the group consisting of hydrogen and lower-alkyl; $R_1$ is selected from the group consisting of hydrogen, alkyl of from 1 to 4 carbon atoms, inclusive, phenyl, hydroxyphenyl, alkoxyphenyl wherein alkoxy is of from 1 to 4 carbon atoms, inclusive, and halophenyl; $R_2$ is selected from the group consisting of hydrogen, alkanoyl of from 1 to 4 carbon atoms, inclusive, benzyl and halobenzyl which can be substituted with alkyl or alkoxy of from 1 to 4 carbon atoms, inclusive, and alkyl of from 1 to 4 carbon atoms, inclusive; and $R_3$ is selected from the group consisting of hydrogen, hydroxy, benzyloxy, alkyl of from 1 to 4 carbon atoms, inclusive, halogen, and alkoxy of from 1 to 4 carbon atoms, inclusive.

9. 2-lower-alkyl-1,3,4,5-tetrahydrobenz[cd]indole-3-carboxylic acid.

10. 2-methyl-1,3,4,5-tetrahydro-benz[cd]indole-3 - carboxylic acid.

11. 1,3,4,5-tetrahydrobenz[cd]indole-3-carboxylic acid.

12. A method of producing a compound of the formula

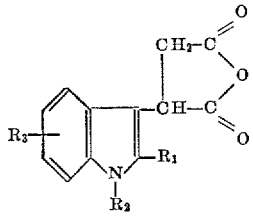

(V)

comprises dehydrating a compound of the formula

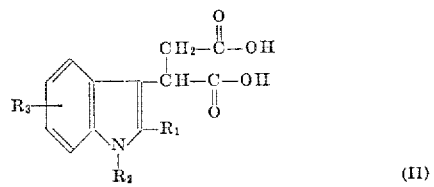

(II)

wherein $R_1$, $R_2$, and $R_3$ are as given in claim 1 with the isopropenyl ester of an alkanoic acid of from 1 to 4 carbon atoms, inclusive.

13. A process of making a compound of the Formula I which comprises cyclizing a compound of the Formula V with aluminum chloride.

14. The process of making a compound of the Formula I which comprises dehydrating a compound of Formula II with the isopropenyl ester of an alkanoic acid of from 1 to 4 carbon atoms, inclusive, to give a compound of the Formula V and cyclizing the last named compound with aluminum chloride.

15. The process of making a compound of the Formula IV wherein $R_2$ is hydrogen which comprises dehydrating a compound of Formula II with the isopropenyl ester of an alkanoic acid of from 1 to 4 carbon atoms, inclusive, to give a compound of the Formula V, cyclizing the last named compound with aluminum chloride to give a compound of Formula I, and reducing the 5-oxo group of the last named compound with hydrazine.

16. The process of making a compound of the Formula IV which comprises cyclizing a compound of Formula V with aluminum chloride to give a compound of the Formula I, and reducing the 5-oxo group of the last named compound with hydrazine.

References Cited in the file of this patent

Diels et al.: Ann., volume 490, pages 277–289 (1931).
Uhle: J. Amer. Chem. Soc., volume 71, pages 761–766 (1949).
Plieninger et al.: Chemische Berichte, volume 89, page 274 (1956).
Noland et al.: J. Organic Chem., volume 23, pages 320–322 (1958).
Plieninger et al.: Chemische Berichte, volume 93, pages 2029–2034 (1960).

UNITED STATES PATENT OFFICE
CERTIFICATE OF CORRECTION

Patent No. 3,108,116            October 22, 1963

Jacob Szmuszkovicz

It is hereby certified that error appears in the above numbered patent requiring correction and that the said Letters Patent should read as corrected below.

Column 4, line 6, for "2,20,521" read -- 2,220,521 --; column 5, line 66, for "(3,30)" read -- (3,300) --; column 9, line 39, for "N, 516" read -- N, 5.16 --; column 10, line 49, for "2-p-(Anisyl)-", in italics, read -- 2-(p-Anisyl)- --, in italics; column 11, line 43, for "anisyl)1,3,4,5" read -- anisyl)-1,3,4,5 --; column 12, lines 40 and 41, for "2-p-", in italics, read -- 2-(p- --, in italics; column 16, line 11, for "EXAMPLE 28" read -- EXAMPLE 25 --; line 37, for "1-(p-methylbenzyl-, 1-(p-chlorobenzyl-" read -- 1-(p-methylbenzyl)-, 1-(p-chlorobenzyl)- --.

Signed and sealed this 12th day of May 1964.

(SEAL)
Attest:

ERNEST W. SWIDER            EDWARD J. BRENNER
Attesting Officer            Commissioner of Patents